United States Patent [19]

Apple et al.

[11] Patent Number: 4,975,929

[45] Date of Patent: * Dec. 4, 1990

[54] CLOCK RECOVERY APPARATUS

[75] Inventors: William R. Apple, San Jose; William R. Freeman, Richmond; Paulmer M. Soderberg, Menlo Park, all of Calif.

[73] Assignee: Raynet Corp., Menlo Park, Calif.

[*] Notice: The portion of the term of this patent subsequent to Sep. 25, 2007 has been disclaimed.

[21] Appl. No.: 405,799

[22] Filed: Sep. 11, 1989

[51] Int. Cl.⁵ .............................................. H03D 3/24
[52] U.S. Cl. .................................. 375/119; 370/105.3; 331/1 R
[58] Field of Search ................. 375/85, 86, 106, 110, 375/118, 119; 331/1 A, 1 R; 328/151; 370/85.1, 100.1, 105.1, 105.3; 178/70 R

[56] References Cited

U.S. PATENT DOCUMENTS

| | | | |
|---|---|---|---|
| 3,470,478 | 9/1969 | Crafts | 329/128 |
| 3,959,589 | 5/1976 | von Roesgen | 375/118 |
| 3,980,820 | 9/1976 | Niemi et al. | 178/695 |
| 3,982,195 | 9/1976 | Turner | 329/50 |
| 4,059,805 | 11/1977 | de Laage de Meux et al. | 329/50 |
| 4,363,002 | 12/1982 | Fuller | 331/1 A |
| 4,380,083 | 4/1983 | Andersson et al. | 375/120 |
| 4,385,396 | 5/1983 | Norton | 375/110 |
| 4,400,667 | 8/1983 | Belkin | 331/1 A |
| 4,546,394 | 10/1985 | Yamamoto | 375/118 |
| 4,672,639 | 6/1987 | Tanabe et al. | 375/106 |
| 4,677,648 | 6/1987 | Zurfluh | 375/120 |
| 4,756,011 | 7/1988 | Cordall | 375/86 |
| 4,799,241 | 1/1989 | Laurent | 375/118 |
| 4,841,551 | 6/1989 | Avanes | 375/119 |

*Primary Examiner*—Douglas W. Olms
*Assistant Examiner*—Stephen Chin
*Attorney, Agent, or Firm*—Dennis E. Kovach

[57] ABSTRACT

A digital phase acquisition circuit includes logic for detecting an edge of incoming data and a plurality of candidate clock phases, the circuitry further including logic for determining when the data undergoes a phase transition and at least one candidate phase which undergoes a digitally equivalent transition close in time to the data transition so as to enable the candidate phase to be used for a clock for recovering information representative of the data. The circuit allows clock to be recovered within 1 bit time of a predetermined data transition occurring, thus allowing preambles of 1 bit to be utilized in data packets.

20 Claims, 7 Drawing Sheets

FIG_1

FIG_3

FIG_2

FIG_4

FIG_5A

FIG_5B

FIG_6A

FIG_6B

CLOCK RECOVERY APPARATUS

CROSS-REFERENCE TO RELATED APPLICATION

The present invention is related to U.S. patent application entitled "Clock Recovery Apparatus Including a Clock Frequency Adjuster" being filed simultaneously herewith and assigned to the assignee of the invention, the disclosure of which is incorporated herein by reference. In particular, the present application dominates this related application, the present application disclosing means for detecting phase of an incoming signal of known frequency, the related application disclosing means for compensating for drift of this known frequency.

BACKGROUND OF THE INVENTION

The present invention relates to an apparatus for recovering clock, and in particular to an apparatus for recovering clock for data received asynchronously or synchronously, especially in relatively small baud length or bit length packets.

Conventionally, phase lock loops (PLLs) are utilized for recovering clock for data to be received in digital format. A disadvantage of PLLs is that a relatively high number of preamble data bits is required for the PLL to acquire a proper clock signal, and constant reinforcement for this clock signal (e.g. transition line encoding) must be contained within the data to prevent the PLL from unlocking from a dominant frequency detected from the preamble. PLLs typically require about 10 or more bits of preamble for adequately locking onto a dominant frequency. Examples of PLLs are found in U.S. Pat. Nos. 4,385,396; 4,677,648; and 3,980,820, the disclosures of which are incorporated herein by reference.

The inclusion of an excessively long preamble and transition line encoding to maintain a PLL clock can significantly increase a bit rate for a system. In the case of an asynchronous packetized system for transmitting telephone signals along a bus or ring, the overhead can easily exceed 50% of the total signal. Specifically, for a packet of data containing eight bits with eight preamble bits and 4B5B transition line encoding, the actual data content of any packet is less than half of the signal bits actually transported.

Other circuits, see e.g. Tanabe et al., U.S. Pat. No. 4,672,639, acquire phase repeatedly to "build" a confidence factor for selecting a proper clock phase. That approach allows the circuit to maintain clocking of data even when preamble bits are missed. Building a confidence factor, however, requires the sampling of many bits over a period of time before a clock is selected. This increases the necessary transmission speed which increases power requirements and increases costs.

SUMMARY OF THE INVENTION WITH OBJECTS

It is therefore an object of the present invention to provide a method and means for recovering clock for data in a more efficient and reliable manner than heretofore proposed, specifically in as little as one bit time.

According to the invention, a digital phase acquisition device for acquiring clock for detecting data, comprising:

means for generating a clock signal of predetermined frequency;

means for generating N sample clock signals each having the predetermined frequency and being separated in phase from one another;

digital means for finding an edge in a data signal and choosing any one of the N sample clock signals within two data bit time periods of an instant when a data edge is found for sampling the data to detect HIGH and LOW values therein;

the data signal including at least one packet having a clock recovery preamble of only 1 bit.

Preferably, the device further includes means for latching onto the selected clock signal to maintain clock over segments of data signals which lock any clock edges and means can optionally be provided for latching onto the selected clock signal for a predetermined number of bit time periods corresponding to a length of the packet being detected by using a counter.

These and other objects will be more apparent by reference to the following detailed description and drawings.

DESCRIPTION OF THE PREFERRED EMBODIMENTS

Figure 1:
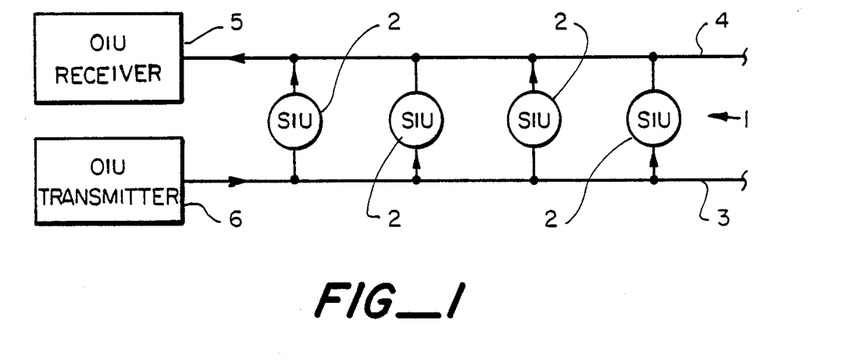
FIG. 1 illustrates a network for which a clock recovery device of the invention is particularly useful.

FIG. 1 illustrates a telecommunications system 1 for which a clock recovery apparatus according to the invention is particularly useful. According to the system 1, a plurality of subscriber interface units (SIUs) 2 receive information from an office interface unit (OIU) transmitter 6 by preferably passively tapping signals from a read bus 3. Signals to be transmitted by the SIUs are transmitted along a write bus 4 and detected by an OIU receiver 5. Examples of preferred taps are disclosed in U.S. Pat. No. 4,741,585 and in U.S. patent application Ser. No. 137,317, the disclosures of which are incorporated herein by reference.

For the case where the SIUs 2 are required to transmit information so as to be detectable on a "real time" basis, as is the case for telephone signals, an amount of data actually transmitted continuously by the telephone is relatively small, e.g. on the order of 8 bits, and a repetition rate thereof is relatively high, e.g. 8000 times a second. Accordingly, with such a format, 64 kilobits of signal is sent each second. If the data to be sent is done so in a packetized format, and if each SIU transmits its data only and in a "blind" fashion, the data from all the SIUs seen by the detector 5 arrives in an asynchronous manner. According to a preferred embodiment, each SIU is connected to a plurality of telephones and optionally other telecommunication equipment, e.g. computers, and hence each packet can have a data length between 8-500 bits, preferably between 8-200 bits, typically between 8-100 bits, e.g. 8, 9, 10, 16, or 17 bits.

The clock recovery apparatus of the invention is most useful in a system 1 wherein data from all the SIUs 2 has a known frequency and unknown phase, one such system being taught in U.S. Ser. No. 935,458, the disclosure of which is incorporated herein by reference. The invention provides a simple and very efficient manner of determining the phase of each packet with as little as a few bit time periods, e.g. 4, 3, 2 or 1 data bit time periods, so as to require a preamble length of as little as 4, 3, 2 or 1 bit.

According to a preferred embodiment of the invention, a plurality of N phases each having equal frequency and being delayed with respect to a neighboring phase by $\pm\pi/N$ are generated. Then with appropriate circuitry using edge detecting techniques, an edge of incoming data is matched as nearly as possible to an edge of one of the phases, and the matched phase is thereafter used for choosing the optimum clock phase for decoding the data. According to a preferred embodiment, a LOW to HIGH transition in the data is detected, though the invention can also be used to trigger off a HIGH to LOW edge as well.

Optionally, the data bit which generates the match is detected using the chosen clock phase, and this detected bit is analyzed to insure its level is consistent with the edge previously detected to insure reliability. According to some preferred embodiments, the circuit which detects the data edge and chooses the appropriate clock phase does so repeatedly for each bit having a detectable edge so that a new clock phase can rapidly be acquired should a false match be detected previously or should the OIU or SIU clock drift an undue amount. An alternate preferred embodiment is to utilize a counter so that the chosen clock phase is latched a predetermined number of bit time periods equal to the time period of the data packet being detected, and then the chosen clock phase is unlatched allowing the circuit to search for a detectable data edge for the next packet. In any case, once a clock phase is chosen, it is latched so as to be capable of accurately detecting data thereafter with no edges, e.g. all 0's or all 1's. Preferred embodiments utilize a circuit which is "triggered" by the data edge to be detected; and alternative embodiments sequentially search for a predetermined data transition within predetermined repetitive "windows" of time.

Figure 2:
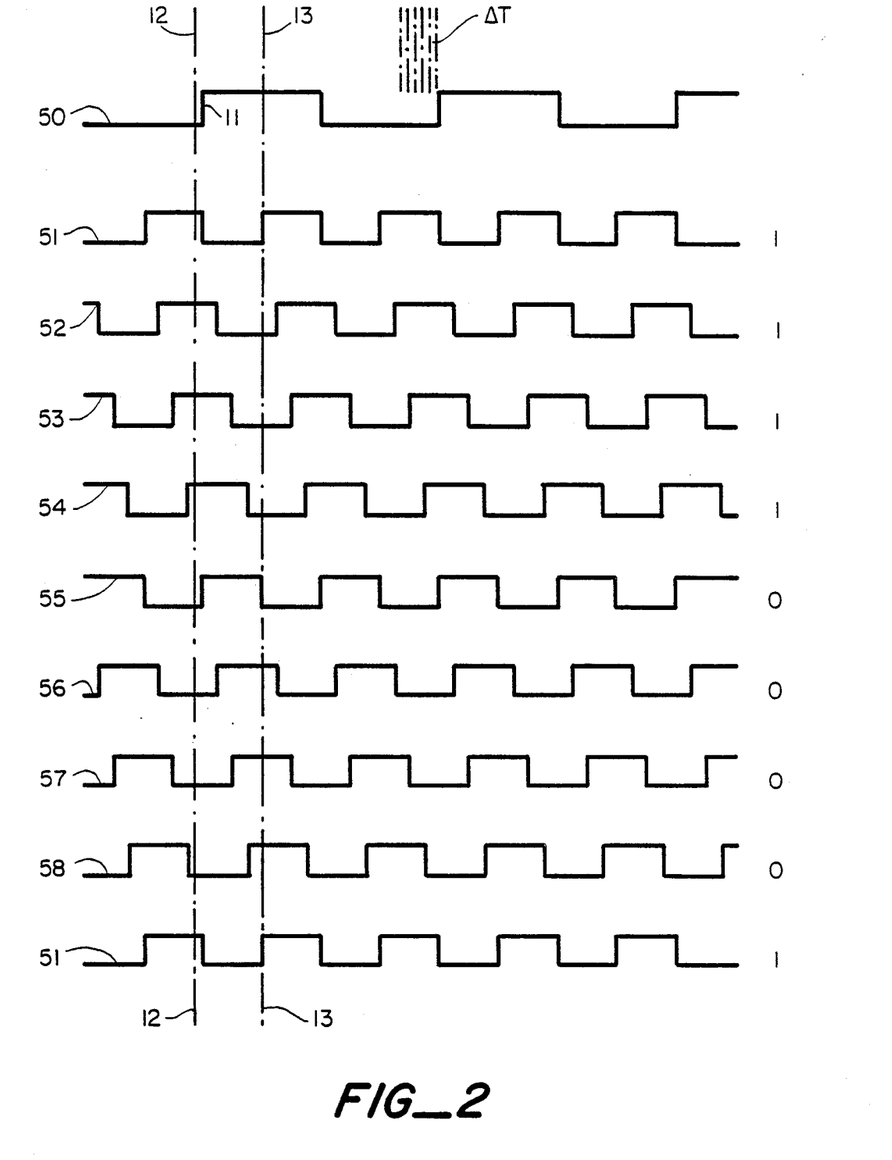
FIG. 2 illustrates a data stream 50 and a plurality of candidate clock phases 51-58 having identical frequencies but being out of phase with one another.

FIG. 2 more clearly illustrates a concept of the invention. Referring to this figure, eight sample clock signal phases 51–58 are illustrated along with a data signal 50 having a LOW to HIGH edge 11 to be detected at time 12. Using sample and hold circuitry and a gate delay to enable a snapshot of the phases to be taken when the edge 11 is detected at time 12, a phase sequence or digital word 11110000 . . . is detected.

A 1 to 0 transition in the digital word identifies the sample clock signal phases closest in phase with the data signal, in this case phases 54 and 55 and a 0 to 1 transition in the digital word identifies the phases inverted which are closest in phase with the data signal, in this case phases 58 and 51. Using either of these phases as a reference, an appropriate phase can thereafter be chosen for detecting the data signal. According to a preferred embodiment, bits of the data signal are sampled and detected at times 13 approximately centered in time for each data bit period.

According to a preferred embodiment, a LOW to HIGH transition in the chosen sample clock signal phase is used to trigger sampling and detecting of the data signal, and accordingly the appropriate sample clock signal phase in this example would be either phase 58 or 51 if detection at time 13 is desired. Of course the invention is usable by triggering and detecting data off a HIGH to LOW transition as well.

According to another preferred embodiment, the data edge 11 is matched with an edge of the particular phase at successive sequential time intervals separated by $\Delta t$, and comparing any transitions or lack thereof between the data and the various phases at these adjacent intervals. The phase which has an edge within any time interval where the edge 11 for the data is detected is then used as the reference phase for choosing the appropriate clock phase, though a phase having an edge in the time interval either before or after the interval within which the data edge is found could be closer in phase with the data and could also be selected as the reference phase.

Figure 3:
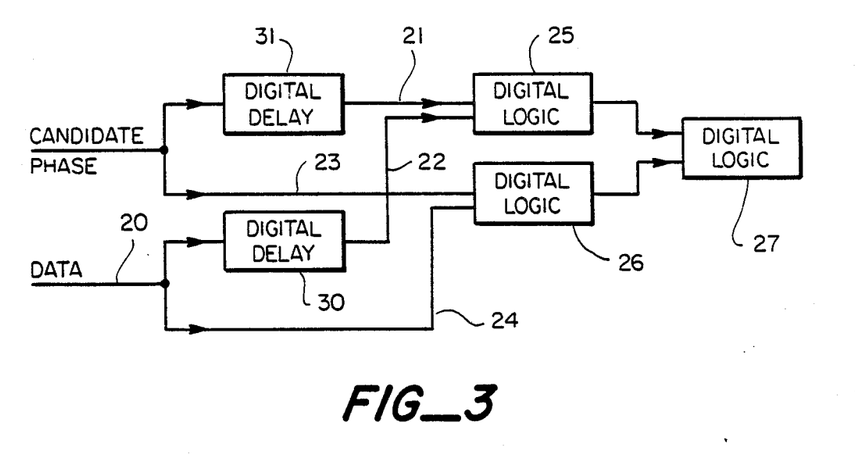
FIG. 3 illustrates a preferred block diagram circuit for comparing and matching a data edge with a candidate phase edge according to the invention.

FIG. 3 illustrates one preferred circuit for this latter embodiment for comparing edges of any one of the phases with the data to be detected. Referring to this figure, both the data stream 20 and a candidate phase are delayed by a digital delay device, with the delayed signals 21, 22 being compared by first digital logic means 25, and undelayed portions of the candidate phase and data stream 23, 24 being similarly analyzed by digital logic means 26, with outputs from the first and second logic means 25, 26 being analyzed by digital means 27 for determining if both the candidate phase and the data stream underwent a predetermined transition and therefore should be used for choosing the desired clock phase for thereafter decoding the data by conventional means, e.g. by sampling the data at times approximately in the center of each bit to detect logic of LOW or HIGH values.

Figure 4:
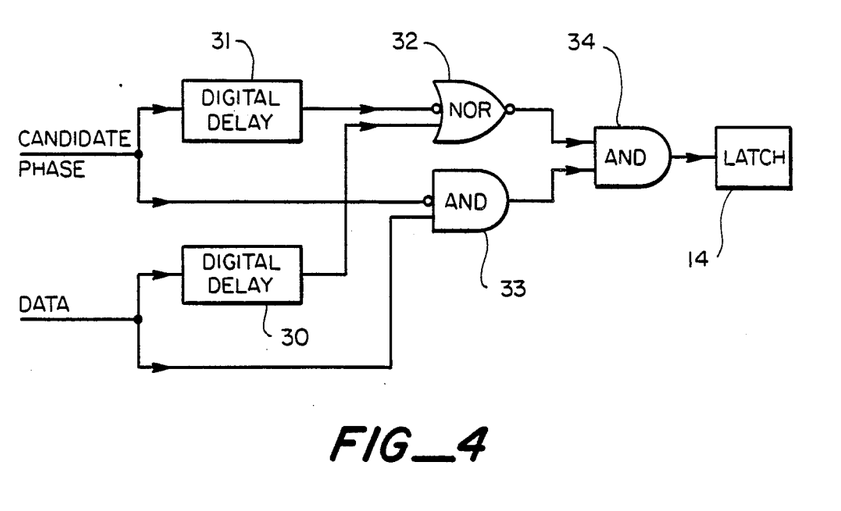
FIGS. 4-6 illustrate preferred circuits of the invention for selecting an optimum phase for clock recovery.

FIG. 4 illustrates another preferred embodiment of appropriate digital logic means for comparing edge transitions between the data and candidate phases, the first digital logic means being a NOR gate, and the second and third digital logic means being AND gates. The digital delays 30, 31 could be any conventional electronic component, e.g. flipflops. Referring to this figure, AND gate 34 only outputs a HIGH during a time period $\Delta t$ when the data undergoes a LOW to HIGH transition and the candidate phase undergoes a HIGH to LOW transition, and thereafter LOW to HIGH transitions in the candidate phase are used to detect the data at approximately a center of each bit cell. Latching means 14 latches onto this chosen clock phase to thereafter detect data even if no edge transitions follow. As previously discussed, the latching means can be unlatched after a predetermined bit time period corresponding to a length of the packet or can be unlatched when the circuit again detects the predetermined edge transitions between the data and various clock phases in which case a new chosen clock phase is immediately latched.

Accordingly, utilizing a plurality of circuits such as that illustrated in FIGS. 3 and 4 in parallel, one for each candidate phase and a sample of the data it is evident that the phase having a predetermined edge transition within any given time $\Delta t$ of an edge transition of the data (LOW to HIGH or HIGH to LOW) enables an appropriate phase to always be selected.

If the interval $\Delta t$ is longer than the phase delay between adjacent phases, e.g. $2\pi/N$, it is evident that for any data edge transition detected at least one of the phases will include a digital equivalent edge. Though a possibility exists that more than one phase would include a matching transition, the latching means 14 could simply be programmed to choose the first edge match detected, for example, though alternate matching candidates or candidates adjacent matching candidates could be chosen as well depending on design preferences.

One of the advantages and goals of the circuit is to acquire an appropriate clock phase for the incoming packet of data within one data bit time, or data cell. Once the proper clock phase has been selected, that clock phase may be used to "sample" the data cell with no need for further reinforcing transitions in the data. Thus, a digital signal of all "0"s or all "1"s may be sent and still have a clock that is reasonably aligned to a data cell window. Unlike a PLL, the circuits of the invention require no further reinforcing transitions to constrain the data content or burden the data rate with edge-rich overhead.

Figure 5A:
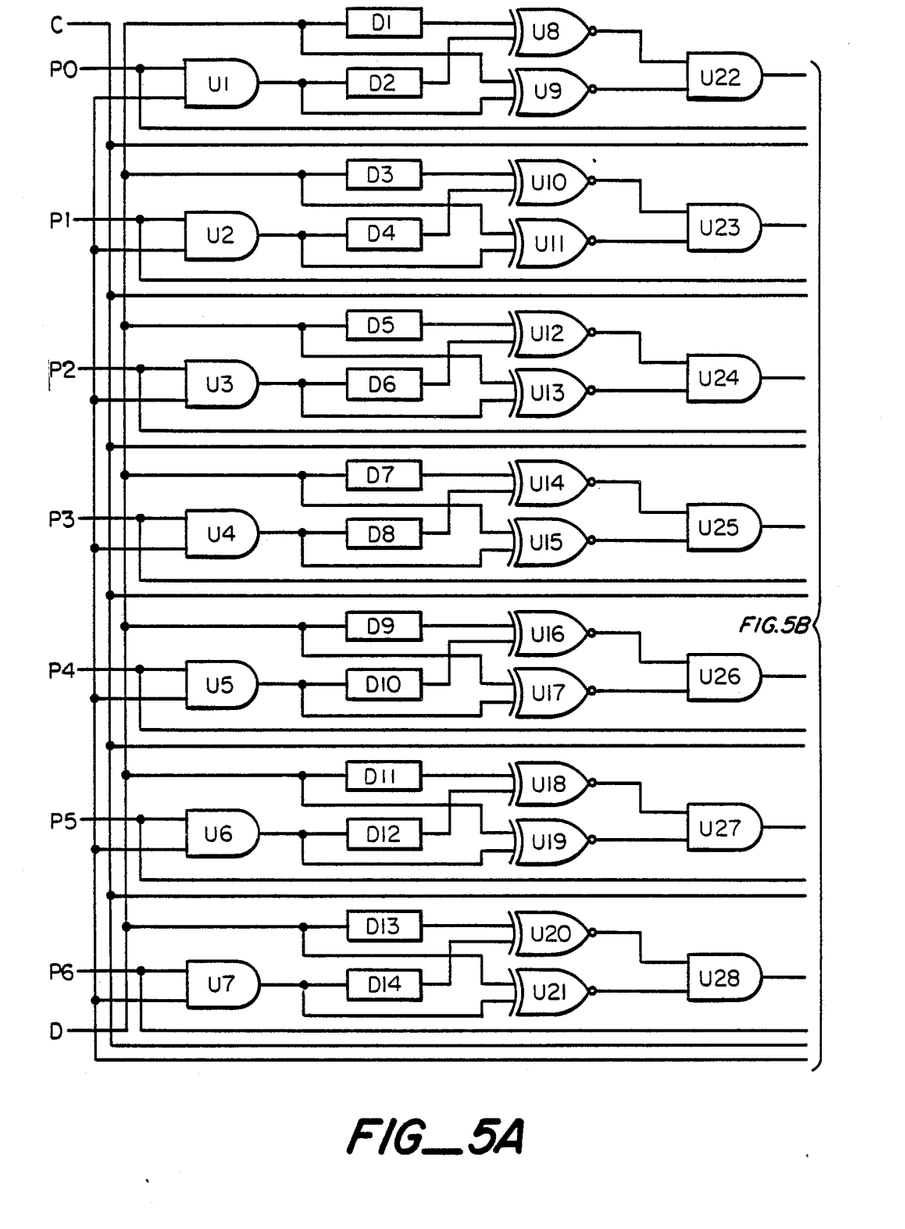
Figure 5B:
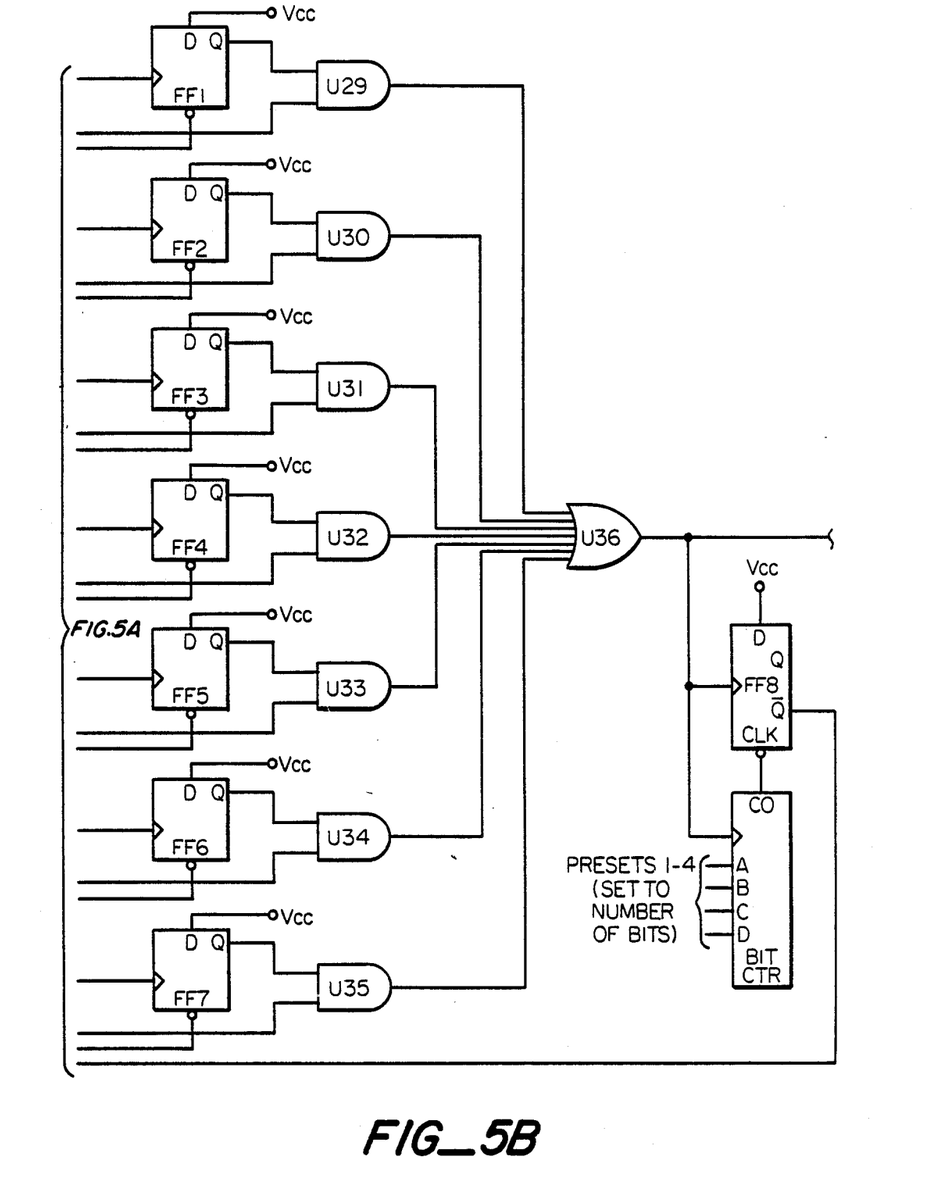

FIG. 5 shows a further preferred embodiment of the invention. An incoming serial data stream "D" is input to the circuit consisting of 7 identical blocks of logic. Each block consists of 2 delays, 3 2-input AND gates, 2 exclusive NOR gates, and a single "D" flipflop. Each functional block receives inputs from the data "D" and a phase of a clock whose frequency is known. Assuming the frequency of the incoming data stream to be of frequency "f" allows 7 discrete phases of a local source of frequency "f" to be generated. Thus, the phases P0-P6 will represent 7 equal divisions of the base phase of "f". Each phase will serve as an input to a unique functional block along with the data "D". The object is for one of the phases to "match" the phase of the incoming data stream "D".

Assuming that the signal P6 most closely matches the phase of the incoming data, an analyses of the functions of components U7, D13-D14, U20, U21, U28, FF7, U35, U36, FF8 and Bit Ctr. 1 will be described. A sample of data "D" is presented at delay D13 and proceeds through the delay to provide a delayed version of "D" which attaches to an input of exclusive NOR U20. "D" is also routed to an input of exclusive NOR U21. Thus, the data as it appears at a specific point in time and sample of the data as it appeared a certain amount of time prior to then is available simultaneously. At the same time another delay D14 is used to perform the same signal delay to clock phase P6. Thus, a delayed version of P6 will be presented to the remaining input of U20, and the non-delayed P6 will be presented to the remaining input of U21. The question that U21 must answer is, "Is logic level of "D" the same as the logic level of P6 at this specific point in time?". Similarly, U20 must determine if the delayed version of "D" at the same logic level as the delayed version of P6 at the same specific point in time. This comparison of delayed signals and actual signals has the effect of determining if the both sides of two independent signals, both having positive-going edges, are approximately in phase with each other. Therefore if the delayed P6 and delayed "D" match at a specific point in time, and the actual P6 and "D" match at a previous (delayed) point in time, one may assume the two signals to be in phase. In a circuit where neither P6 nor "D" have edges the match will still be made, and U20 and U21 will still show matches, but no meaningful signal will result at the output of U36. If P6 and "D" have real edges that align, U20 and U21 will show logic 1's at their outputs and will cause U28 to present a transition to logic 1 to flipflop FF7. FF7 will then latch a logic 1 from the "D" input to the "Q" output. That logic 1 will "gate" through the clock P6 to the OR gate U36 where it will pass through and be used as a phase-aligned clock for extracting data from subsequent bit "cells" in data stream "D". The first clock edge through U36 will also cause flipflop FF8 to set $\overline{Q}$ to a logic 0. This logic 0 becomes enable signal "E" where it will be used to disallow subsequent changes to flipflops FF1-FF8 until BIT CTR 1 (bit counter 1) counts to a predetermined number of clock cycles (bits) and resets FF8 to once again enable "E" for the next phase matching. The sample circuit shown assumes prior knowledge of the number of bits in the asynchronous data stream "D". Thus, after counting to that number of bits, the circuit will reset itself to readiness for the next asynchronous incoming data stream.

Figure 6A:
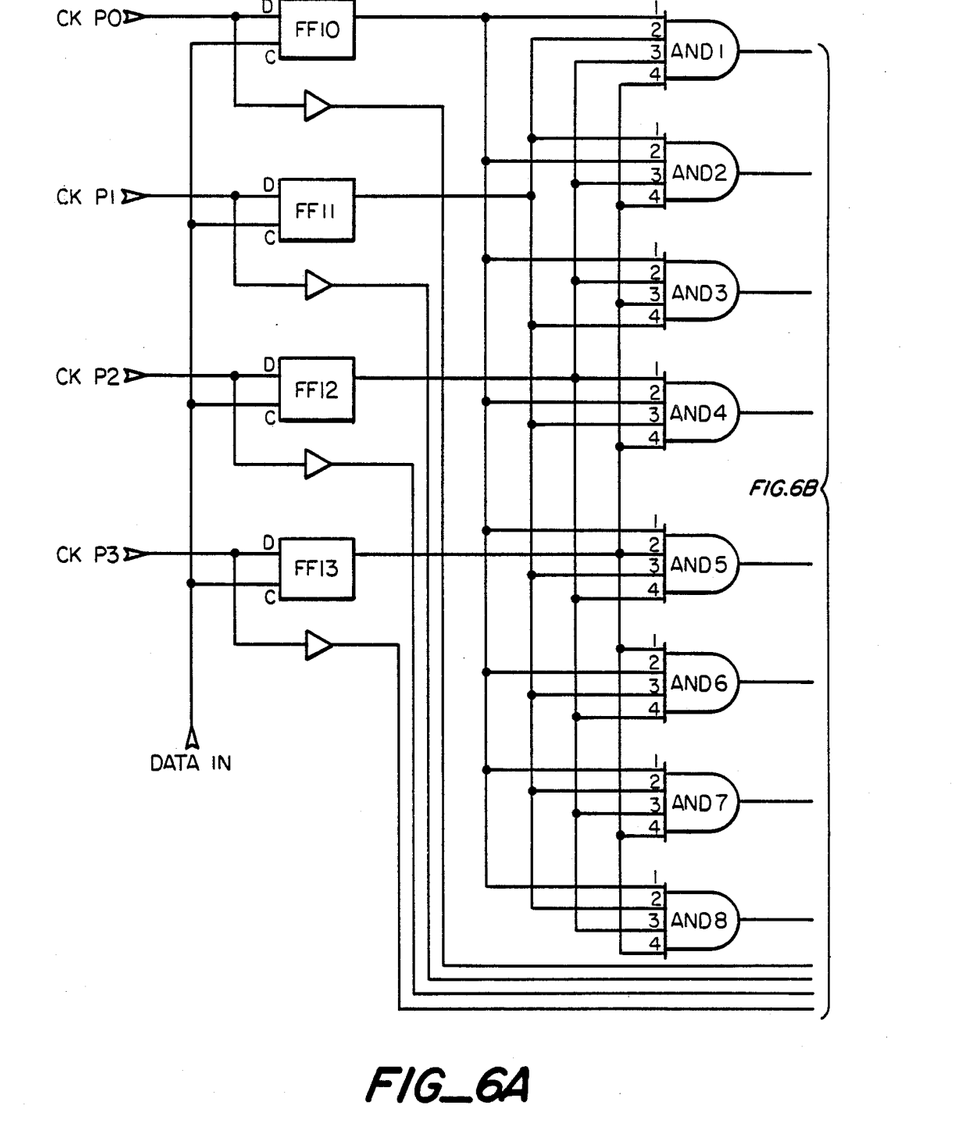
Figure 6B:
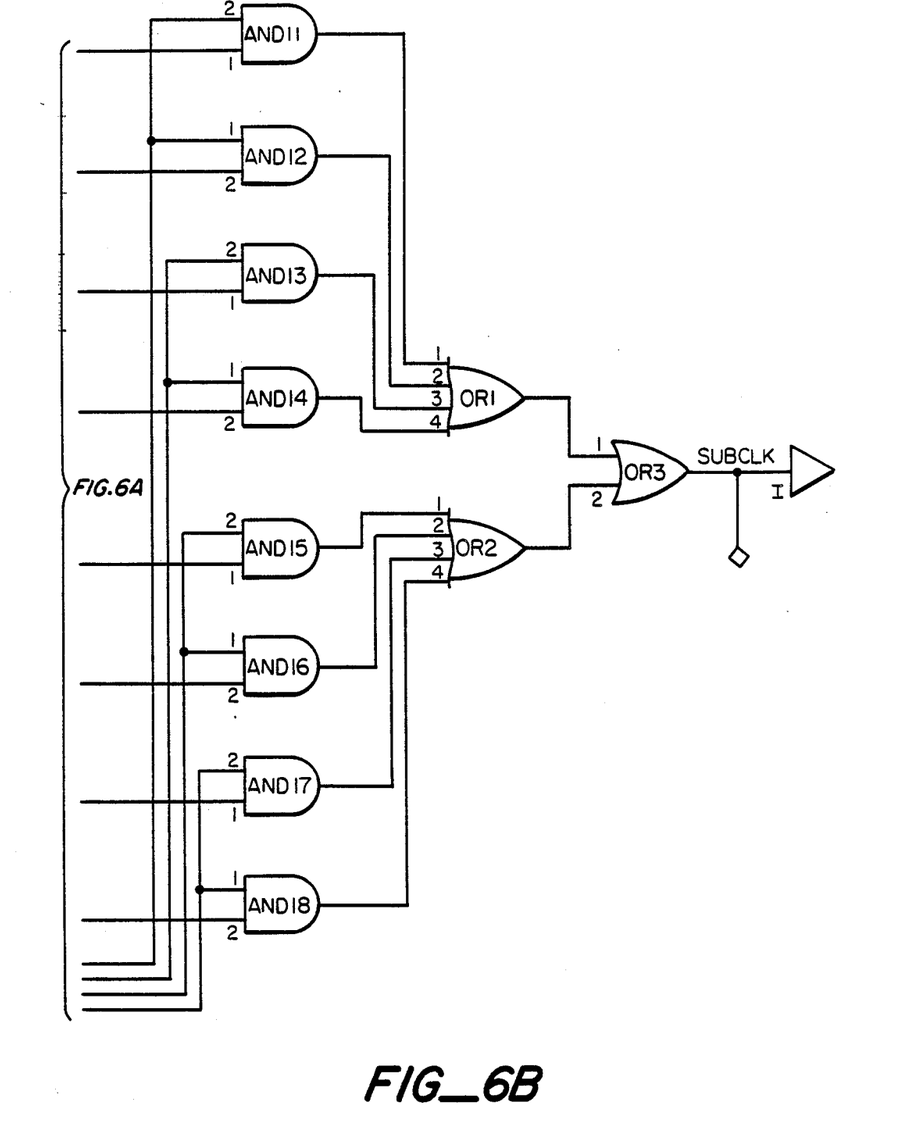

FIG. 6 shows a circuit "snapshot" embodiment of the invention. As shown in FIG. 6, four sample clock signal phases labeled CKP0, CKP1, CKP2, CKP3 are inputted to four edge-triggered flipflops FF10, FF11, FF12, FF13 respectively. The data signal, DATA IN, represents an incoming asynchronous packet of data with a known frequency but unknown phase. The transmission line from which the DATA IN signal comes is assumed to be in a silent, or LOW, state before the transmitted packet arrives at the circuit.

CKP0-CKP3 are four distinct phases of a single sample clock which frequency is, by design, the same frequency as the clock responsible for the transmission and structure of the received DATA IN signal. Each of these phases go to an individual edge-triggered D flipflop and are "clocked" into the "D" input of the respective flipflop by the first LOW to HIGH edge (assumed to be a single "preamble" bit) of the DATA IN signal. Thus, a "snapshot" of phases CKP0-CKP3 is taken at the time of the DATA IN transition. By comparing the instantaneous samples of these phases with the "phase" of the DATA IN transition, it is possible to superimpose these "candidate" phases and DATA IN and determine which of the phases is closest to the incoming data packet.

When the latched versions of CKP0 through CKP3 are each simultaneously "ANDed" with DATA IN, a unique data "word" is formed, across those phases showing which phases were HIGH at the same time DATA IN underwent a LOW to HIGH transition and which phases were not. The "snapshot" of the candidate phases reveals a pattern of contiguous "0"s as well as a pattern of contiguous "1"s. Since the "1"s represent the phases that were HIGH at the same time as DATA IN was HIGH, and the "0"s represent the phases that were LOW at the same time as DATA IN was LOW, it can be assumed that the first candidate phase which ANDs to a "1" (and whose previous phase ANDed to a "0") will be reasonably close to the transition of the DATA IN signal itself.

The exact resolution of alignment is a function of the number of phases represented in the candidate phases. For example: a four candidate phase circuit will align clock transitions within 90° of the incoming asynchronous data packet. A sixteen candidate phase digital phase acquisition circuit will align to within 23° of the incoming data.

At the time of the DATA IN LOW to HIGH transition, AND gates AND1-AND8 analyze the candidate phases along with their inverses in such a way to "decode" at which phase the "0" to "1" result occurs. The inverse of each phase can be considered as another unique phase which may also be considered as a candidate for the selection process. Thus, CKP0 through CKP3 also produces CKP4 through CKP7 for a resolution of 360° divided by 8°, or 45°. An example of a "snapshot" of all the phases could produce a pattern such as:

CKP0: 0
CKP1: 0
CKP2: 0
CKP3: 1
CKP4: 1
CKP5: 1
CKP6: 1
CKP7: 0

This example indicates that candidate phase CKP3 is closest in phase to the LOW to HIGH transition of DATA IN. By placing the inverters (bubbles) on selected input pins of the 4-input AND gates, the electronics can be hardwired to look for this transition in the pattern. The appropriate 4-input AND gate, upon recognizing its candidate phase as a "1" and the previous candidate phase as a "0" will output an enabling signal to one of the 2-input AND gates AND-11-AND18. The enabling signal will "gate" one of the original phased clock signals through one of the AND gates AND11-AND18 and on through the OR1-OR3 gates to be used as a final clock for reading the data cells in the DATA IN signal. In this example, AND4 and AND14 are enabled so as to gate CKP2 through OR1 and OR3.

Only one candidate clock phase will be selected since there is only one point in the "snapshot" in which the transition from a "0" to a "1" will be observed. The "selected" clock may then be used reliably as long as the transmitting clock and the clock from which the candidate phases are derived do not drift sufficiently apart in frequency. In the case of crystal oscillators, packets containing hundreds of bit cells may be reliably read as the crystal oscillator is a highly stable source of clocking reference.

The circuit shown in FIG. 6 has been tested to greater than 10 Mbps with reliable acquisition of phase in a single preamble bit of time. The frequency must be selected in the design process as one that is exactly the same as the signal expected in reception as this circuit acquires phase but not frequency. Higher speed circuits that acquire phase in an asynchronous data packet of hundreds of megabytes per second will work using this same approach by altering the speed of the gates themselves. This is to say that the gate propagation delays themselves are the only limiting factors as to how fast of an incoming signal may be "phase aligned".

Optionally, a preferred circuit of the invention utilizes a gate configuration such that adjacent candidate phases differ from one another by a change of only one character of its identifying binary code. Accordingly, in the event that any of the gates or flip flops or other elements making up the clock recovery circuit malfunction so as to yield a binary word which is erroneous, absent multiple gate failures occurring simultaneously, the phase ultimately selected by the circuit will be immediately adjacent the phase which should have selected. Hence, the resultant error will be inconsequential since phase alignment will be off only a small angle, e.g. the angle between adjacent phases, especially in the case where a relatively large number of candidate phases are being used, e.g. 8 or 16 and hence the angle between adjacent phases is relatively small.

Some prior art circuits acquire phase repeatedly to "build" a confidence factor for selecting the proper clock phase. That approach allows the circuit to maintain clocking of data even when preamble bits are missed. Building a confidence factor, however, requires the sampling of many bits over a period of time before a clock is selected. The circuits of the invention on the other hand are useful in applications which are not afforded the luxury of more preamble bits and data transition encoding overhead. Thus, the invention is useful in keeping transmission speeds down. The lowering of transmission speeds typically decreases power required and may, depending on the range of speed used in transmission, allow lower cost and more highly integrated electronic technologies to be used in an application.

As previously discussed, it is most preferable that the circuit of the invention include only digital delays and digital logic, as compared to analog, so that the invention can be implemented in ASIC chips. Digital logic has an additional advantage that it is much faster than analog logic, thus insuring that clock for data to be detected is recovered within one bit time of a predetermined data edge transition occurring. In addition, though a preferred phase separation between adjacent candidate clock phases has been given, it is evident that other alternative phase separations could be chosen according to the invention. Also, though the invention has been described by reference to preferred embodiments where specified number of candidate phases are used, the invention includes all alternate phase generation numbers, the particular number chosen being determined by overall system speed and reliability considerations, the device of the invention being perfectly useful using as few as 4, 6, or 8 candidate phases, or as many as 20, 30 or even 40 candidate phases. Accordingly, the invention is to be limited only by the appended claims.

We claim:

1. A digital phase acquisition device for acquiring clock for detecting data, comprising:
   means for generating a clock signal of predetermined frequency;
   means for generating N sample clock signals each having the predetermined frequency and being separated in phase from one another;
   digital means for finding an edge in a data signal and choosing any one of the N sample clock signals within two data bit time periods of an instant when a data edge is found for sampling the data to detect HIGH and LOW values therein;
   the data signal including at least one packet having a clock recovery preamble of only 1 bit;
   means for latching onto the chosen sample clock signal, the latching means being unlatched when the digital means finds another data signal edge.

2. The device of claim 1, the sample clock signal chosen being used to detect a level of the preamble bit, the any one of the N sample clock signals being chosen within one data bit time period of the instant when the data edge is found.

3. The device of claim 1, each of the N sample clock signals being separated in phase by $2\pi/N$.

4. The device of claim 1, the data being in packetized format arranged in frames each having a plurality of packets, at least one packet per frame having a baud length less than 17.

5. The device of claim 4, the packets being received asynchronously, a clock frequency of each packet being identical, the packets differing in phase relative to adjacent packets.

6. A digital phase acquisition device for acquiring clock for detecting data, comprising:
- means for generating a clock signal of predetermined frequency;
- means for generating N sample clock signals each having the predetermined frequency and being separated in phase from one another;
- digital means for finding an edge in a data signal and choosing any one of the N sample clock signals within two data bit time periods of an instant when a data edge is found for sampling the data to detect HIGH and LOW values therein;
- the data signal including at least one packet having a clock recovery preamble of only 1 bit;
- means for latching onto the chosen sample clock signal;
- means for comparing a level of the preamble bit with a level of a data edge transition detected by the digital means.

7. The device of claim 6, the edge being a LOW to HIGH transitional edge.

8. The device of claim 6, each of the N sample clock signals being separated in phase by $2\pi/N$.

9. The device of claim 6, the data being in packetized format arranged in frames each having a plurality of packets, at least one packet per frame having a baud length less than 17.

10. The device of claim 6, the packets being received asynchronously, a clock frequency of each packet being identical, the packets differing in phase relative to adjacent packets.

11. A digital phase acquisition device for acquiring clock for detecting data, comprising:
- means for generating a clock signal of predetermined frequency;
- means for generating N sample clock signals each having the predetermined frequency and being separated in phase from one another;
- digital means for finding an edge in a data signal and choosing any one of the N sample clock signals within two data bit time periods of an instant when a data edge is found for sampling the data to detect HIGH and LOW values therein;
- the data signal including at least one packet having a clock recovery preamble of only 1 bit;
- the digital means including a plurality of digital delays for delaying each of the N sample clock signals and the data signal a predetermined amount, first digital comparing means for comparing a level of a delayed data signal with each delayed sample clock signal, second digital comparing means for comparing a level of the data signal undelayed with each sample clock signal undelayed, means for comparing outputs from the first and second digital means to determine whether the data has undergone a predetermined level transition and whether any of the sample clock signals have undergone an equivalent transition;
- the choosing means selecting the sample clock signal which is 180° out of phase of the sample clock signal which has a delayed level which is digitally equivalent to the level of the delayed data signal and which has an undelayed level which is digitally equivalent to the level of the data undelayed, the delayed level being a binary opposite of the undelayed level.

12. The device of claim 11, each of the N sample clock signals being separated in phase by $2\pi/N$.

13. The device of claim 11, the data being in packetized format arranged in frames each having a plurality of packets, at least one packet per frame having a baud length less than 17.

14. The device of claim 11, the packets being received asynchronously, a clock frequency of each packet being identical, the packets differing in phase relative to adjacent packets.

15. A digital phase acquisition device for acquiring clock for detecting data, comprising:
- means for generating a clock signal of predetermined frequency;
- means for generating N sample clock signals each having the predetermined frequency and being separated in phase from one another;
- digital means for finding an edge in a data signal and choosing any one of the N sample clock signals within two data bit time periods of an instant when a data edge is found for sampling the data to detect HIGH and LOW values therein;
- the data signal including at least one packet having a clock recovery preamble of only 1 bit;
- the digital means including a plurality of D flipflops each having a clock input connected to the data signal and a data input connected to one of the N sample clock signals, and a plurality of logic gates having inputs connected to outputs of the D flipflops so as to gate only one of the N sample clock signals therethrough upon a predetermined transition in the data signal.

16. The device of claim 15, the digital means further including means for inverting the gated sample clock signal and using the inverted sample clock signal for determining levels of the data signal for detecting data therein.

17. The device of claim 16, further comprising means for latching onto the inverted sample clock signal, the latching means being unlatched when the digital means finds another predetermined data signal edge.

18. The device of claim 15, each of the N sample clock signals being separated in phase by $2\pi/N$.

19. The device of claim 15, the data being in packetized format arranged in frames each having a plurality of packets, at least one packet per frame having a baud length less than 17.

20. The device of claim 15, the packets being received asynchronously, a clock frequency of each packet being identical, the packets differing in phase relative to adjacent packets.

* * * * *